United States Patent
Yun et al.

(10) Patent No.: US 12,283,432 B2
(45) Date of Patent: Apr. 22, 2025

(54) MULTILAYER CERAMIC ELECTRONIC COMPONENT WITH A MULTILAYER EXTERNAL ELECTRODE

(71) Applicant: SAMSUNG ELECTRO-MECHANICS CO., LTD., Suwon-si (KR)

(72) Inventors: Hyung Duk Yun, Suwon-si (KR); Do Young Jeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 44 days.

(21) Appl. No.: 17/411,562

(22) Filed: Aug. 25, 2021

(65) Prior Publication Data

US 2022/0115184 A1  Apr. 14, 2022

(30) Foreign Application Priority Data

Oct. 8, 2020 (KR) .................. 10-2020-0130135

(51) Int. Cl.
*H01G 4/30* (2006.01)
*H01G 4/008* (2006.01)
(Continued)

(52) U.S. Cl.
CPC .............. *H01G 4/30* (2013.01); *H01G 4/008* (2013.01); *H01G 4/012* (2013.01); *H01G 4/12* (2013.01); *H01G 4/232* (2013.01); *H01G 4/2325* (2013.01)

(58) Field of Classification Search
CPC .......... H01G 4/30; H01G 4/008; H01G 4/012; H01G 4/12; H01G 4/2325; H01G 4/1227; H01G 4/232; H01G 4/252
See application file for complete search history.

(56) References Cited

U.S. PATENT DOCUMENTS 8,315,036 B2   11/2012   Ogawa et al.
8,982,534 B2   3/2015    Kwag et al.
(Continued)

FOREIGN PATENT DOCUMENTS

JP   H05-144665 A   6/1993
JP   H11-121273 A   4/1999
(Continued)

OTHER PUBLICATIONS

Plating Thickness and Uniformity website (Year: 2024).*

(Continued)

*Primary Examiner* — Nathan Milakovich
*Assistant Examiner* — Daniel M Dubuisson
(74) *Attorney, Agent, or Firm* — Morgan, Lewis & Bockius LLP

(57) ABSTRACT

A multilayer ceramic electronic component includes a ceramic body including a dielectric layer and first and second internal electrodes disposed to be alternately stacked with the dielectric layer interposed therebetween, a first external electrode and a second external electrode connected to the first and the second internal electrode respectively. The first external electrode includes a first base electrode layer disposed in contact with the ceramic body, a first glass layer disposed on the first base electrode layer, and a first resin electrode layer disposed on the first glass layer. The second external electrode includes a second base electrode layer disposed in contact with the ceramic body, a second glass layer disposed on the second base electrode layer, and a second resin electrode layer disposed on the second glass layer.

13 Claims, 5 Drawing Sheets

(51) Int. Cl.
*H01G 4/012* (2006.01)
*H01G 4/12* (2006.01)
*H01G 4/232* (2006.01)

(56) References Cited

U.S. PATENT DOCUMENTS

| | | | |
|---|---|---|---|
| 9,245,690 B2 | 1/2016 | Park et al. | |
| 9,275,804 B2 | 3/2016 | Nishisaka et al. | |
| 9,520,236 B2 | 12/2016 | Ikeda et al. | |
| 2007/0242416 A1* | 10/2007 | Saito | H01G 4/2325 361/321.1 |
| 2009/0002920 A1* | 1/2009 | Itamura | H01G 4/2325 361/321.3 |
| 2009/0303655 A1* | 12/2009 | Ogawa | H01G 4/30 29/25.42 |
| 2012/0295122 A1* | 11/2012 | Park | C03C 3/089 428/471 |
| 2013/0120898 A1* | 5/2013 | Park | H01G 4/30 252/514 |
| 2014/0029157 A1* | 1/2014 | Kwag | H01G 4/232 361/301.4 |
| 2014/0145122 A1* | 5/2014 | Sawai | C03C 8/14 501/15 |
| 2015/0022945 A1 | 1/2015 | Park et al. | |
| 2015/0085422 A1* | 3/2015 | Kim | H01G 4/2325 156/89.18 |
| 2015/0092316 A1* | 4/2015 | Chun | H01G 4/30 427/79 |
| 2015/0243439 A1* | 8/2015 | Kwag | H05K 1/181 361/301.4 |
| 2015/0380164 A1* | 12/2015 | Kodama | H01G 4/0085 361/301.4 |
| 2016/0141103 A1* | 5/2016 | Hamanaka | H01G 4/232 361/301.4 |
| 2016/0172108 A1* | 6/2016 | Ikeda | H01G 4/2325 361/301.4 |
| 2016/0276104 A1* | 9/2016 | Nishisaka | H01G 4/2325 |
| 2017/0018361 A1* | 1/2017 | Nishisaka | H01G 4/2325 |
| 2018/0090271 A1* | 3/2018 | Ito | H01G 4/1209 |
| 2019/0157006 A1* | 5/2019 | Han | H01G 4/008 |
| 2019/0304683 A1* | 10/2019 | Terashita | H01G 4/228 |
| 2019/0355518 A1* | 11/2019 | Harada | H01G 4/30 |
| 2020/0118731 A1* | 4/2020 | Sato | H01F 17/0013 |
| 2020/0388439 A1* | 12/2020 | Togawa | H01G 4/2325 |
| 2021/0027945 A1* | 1/2021 | Takahashi | H01G 4/2325 |
| 2022/0013295 A1* | 1/2022 | Nishisaka | C04B 35/01 |

FOREIGN PATENT DOCUMENTS

| | | | |
|---|---|---|---|
| JP | 2000243662 A * | 9/2000 | H01G 4/2325 |
| JP | 2000-285733 A | 10/2000 | |
| JP | 2002-208535 A | 7/2002 | |
| JP | 2008-159965 A | 7/2008 | |
| JP | 2009-302129 A | 12/2009 | |
| JP | 2010-232320 A | 10/2010 | |
| JP | 2014-27248 A | 2/2014 | |
| JP | 10-1434108 B1 | 8/2014 | |
| JP | 2015-23272 A | 2/2015 | |
| JP | 2015-46644 A | 3/2015 | |
| KR | 10-2013-0090335 A | 8/2013 | |

OTHER PUBLICATIONS

Korean Office Action dated Aug. 25, 2024 issued in Korean Patent Application No. 10-2020-0130135 (with English translation).

Japanese Office Action dated Feb. 25, 2025 issued in Japanese Patent Application No. 2021-143356 (with English translation).

\* cited by examiner

MULTILAYER CERAMIC ELECTRONIC COMPONENT WITH A MULTILAYER EXTERNAL ELECTRODE

CROSS-REFERENCE TO RELATED APPLICATION

This application claims the benefit of priority to Korean Patent Application No. 10-2020-0130135, filed on Oct. 8, 2020 in the Korean Intellectual Property Office, the disclosure of which is incorporated herein by reference in its entirety.

TECHNICAL FIELD

The present disclosure relates to a multilayer ceramic electronic component.

BACKGROUND

Recently, according to the trend of miniaturization of electronic products, multilayer ceramic electronic components are also required to be miniaturized and have high capacity. To meet the demand for miniaturization and high capacity of multilayer ceramic electronic components, external electrodes of multilayer ceramic electronic components are also becoming thinner.

In order to form the external electrode, in the related art, an external electrode paste is prepared by mixing a conductive metal with glass, a base resin, an organic solvent, etc., the external electrode paste is applied to two opposing end surfaces of the ceramic body, the ceramic body is fired to sinter the metal in the external electrodes. The external electrode paste ensures chip sealing and an electrical connection with the chip by using a conductive metal as a main material, fills an empty space when the metal is sintered and contracted by using glass as a sub-material, and serves to provide bonding force between the external electrodes and the chip.

However, as multilayer ceramic electronic components become smaller and have high capacity, external electrodes are gradually becoming thinner, and the application of a thin external electrode causes a problem that it is vulnerable to penetration of external moisture. In addition, a multilayer ceramic electronic component to which external electrodes having a multilayer structure are applied has a structure vulnerable to external physical and chemical impacts and acts as a main cause of a degradation of product quality based on a degradation of mechanical strength.

SUMMARY

A multilayer ceramic electronic component according to one aspect of the present disclosure may provide improved reliability in moisture resistance.

A multilayer ceramic electronic component according to one aspect of the present disclosure may also provide improved mechanical strength by increasing bonding force between layers of an external electrode, having a multilayer structure, even if the external electrodes are formed relatively thin.

A multilayer ceramic electronic component according to one aspect of the present disclosure may also provide low equivalent series resistance (ESR), while also preventing defects such as a peel-off phenomenon or delamination of external electrodes.

According to an aspect of the present disclosure, a multilayer ceramic electronic component may include: a ceramic body including a dielectric layer and first and second internal electrodes disposed to be alternately stacked with the dielectric layer interposed therebetween; a first external electrode connected to the first internal electrode of the ceramic body; and a second external electrode connected to the second internal electrode. The first external electrode includes a first base electrode layer disposed in contact with the ceramic body, a first glass layer disposed on the first base electrode layer, and a first resin electrode layer disposed on the first glass layer. The second external electrode includes a second base electrode layer disposed in contact with the ceramic body, a second glass layer disposed on the second base electrode layer, and a second resin electrode layer disposed on the second glass layer.

According to another aspect of the present disclosure, a multilayer ceramic electronic component may include: a ceramic body including a dielectric layer and first and second internal electrodes disposed to be alternately stacked with the dielectric layer interposed therebetween; a first external electrode connected to the first internal electrode of the ceramic body; and a second external electrode connected to the second internal electrode. The first external electrode includes a first base electrode layer, having a metal, disposed in contact with the ceramic body, and a first glass layer disposed on the first base electrode layer, and the second external electrode includes a second base electrode layer, having a metal, disposed in contact with the ceramic body, and a second glass layer disposed on the second base electrode layer.

According to still another aspect of the present disclosure, a multilayer ceramic electronic component may include: a ceramic body including a dielectric layer and first and second internal electrodes disposed to be alternately stacked with the dielectric layer interposed therebetween; a first external electrode connected to the first internal electrode of the ceramic body; and a second external electrode connected to the second internal electrode. The first external electrode includes a first base electrode layer disposed in contact with the ceramic body, and a first glass layer disposed on the first base electrode layer, the second external electrode includes a second base electrode layer disposed in contact with the ceramic body, and a second glass layer disposed on the second base electrode layer, and each of the first and second glass layers includes conductive glass.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
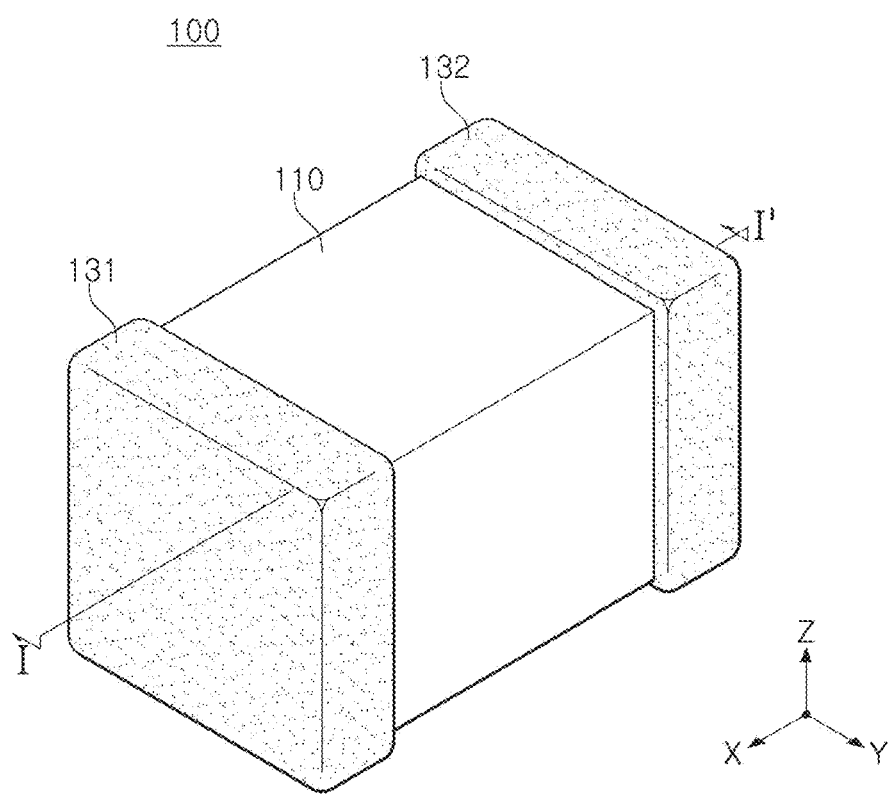
FIG. 1 is a perspective view schematically illustrating a multilayer ceramic electronic component according to an exemplary embodiment in the present disclosure.

Exemplary embodiments of the present disclosure will now be described in detail with reference to the accompanying drawings.

In the drawings, an X direction may be defined as a first direction, an L direction, or a length direction, a Y direction may be defined as a second direction, a W direction, or a width direction, and a Z direction may be defined as a third direction, a T direction, or a thickness direction.

Hereinafter, a multilayer ceramic electronic component according to an exemplary embodiment in the present disclosure will be described in detail with reference to FIGS. 1 through 5.

Figure 2:
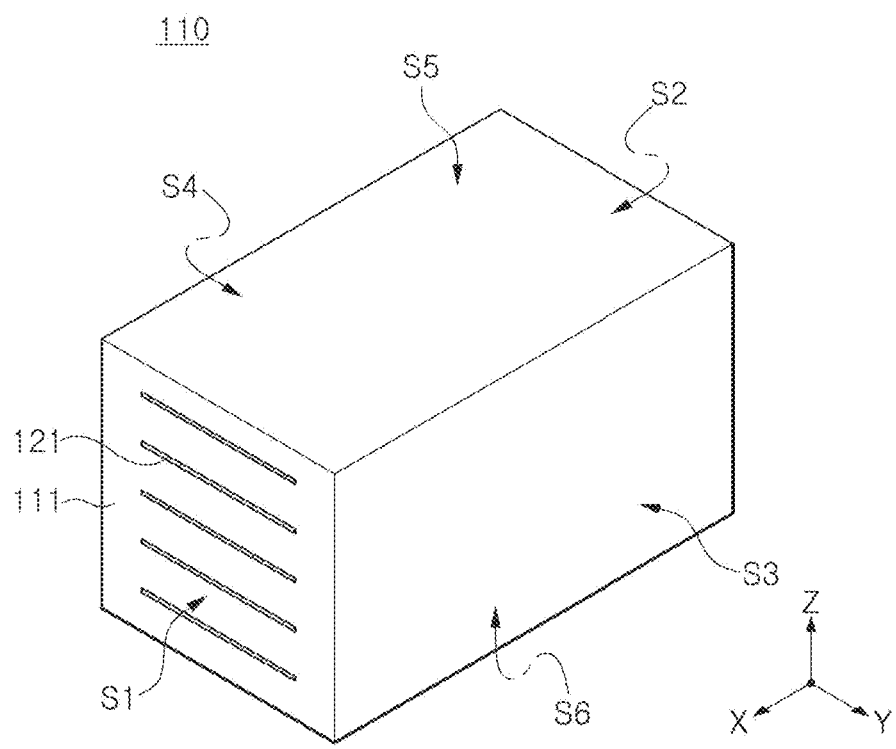
FIG. 2 is a perspective view schematically illustrating a ceramic body of FIG. 1.
Figure 3:
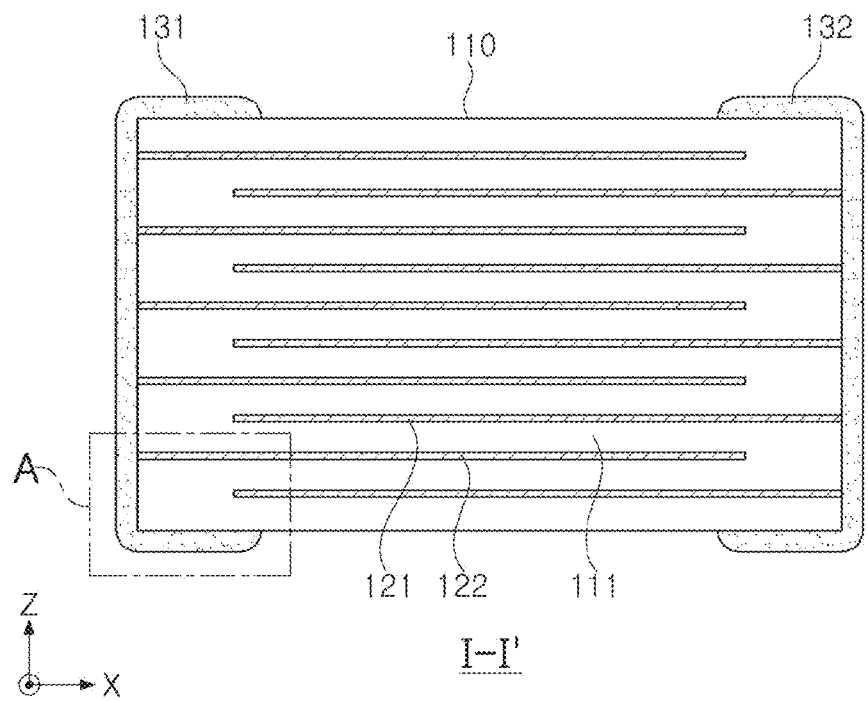
FIG. 3 is a cross-sectional view taken along line I-I' of FIG. 1.
Figure 4:
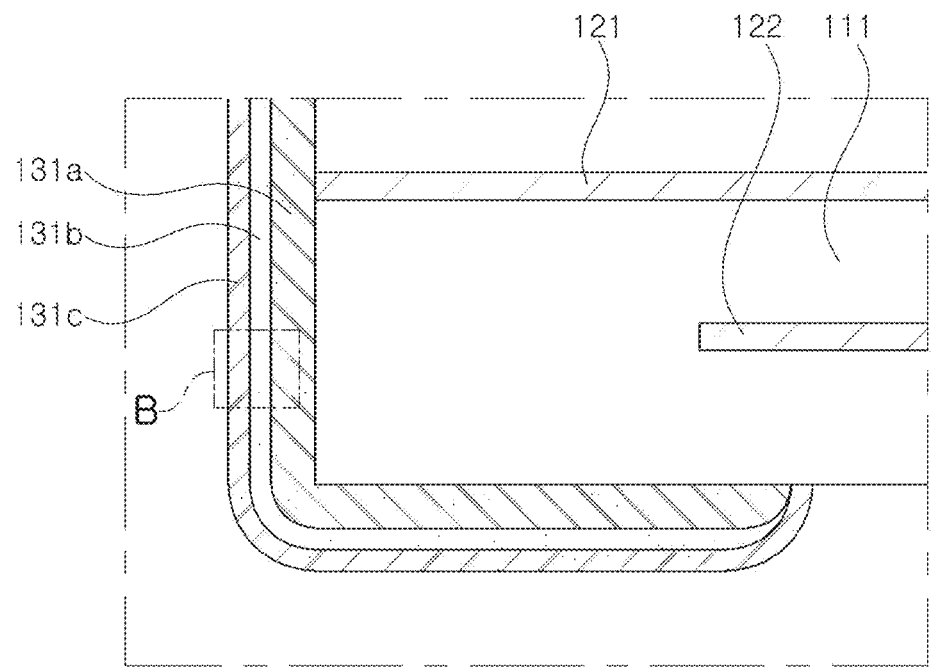
FIG. 4 is an enlarged view of region A of FIG. 3.
Figure 5:
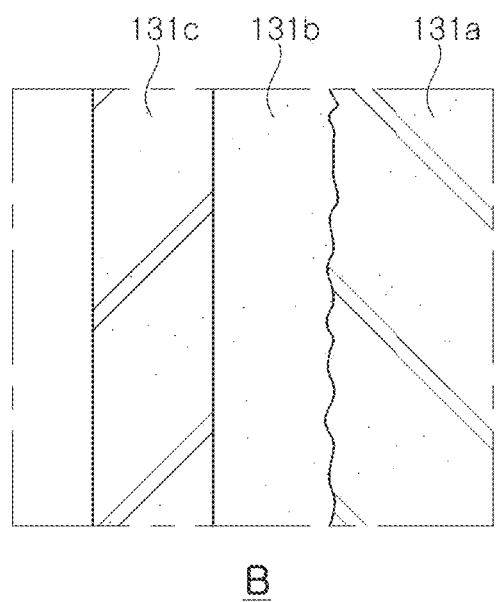
FIG. 5 is an enlarged view of region B of FIG. 4.

FIG. 1 is a perspective view schematically illustrating a multilayer ceramic electronic component according to an exemplary embodiment in the present disclosure, and FIG. 2 is a perspective view schematically illustrating a ceramic body of FIG. 1. FIG. 3 is a cross-sectional view taken along line I-I' of FIG. 1, FIG. 4 is an enlarged view of region A of FIG. 3, and FIG. 5 is an enlarged view of region B of FIG. 4.

Referring to FIGS. 1 through 5, a multilayer ceramic electronic component 100 according to an exemplary embodiment in the present disclosure may include a ceramic body 110 including a dielectric layer 111 and first and internal electrodes 121 and 122 disposed to be alternately stacked in the third direction (Z direction) with the dielectric layer 111 interposed therebetween. The ceramic body 110 may have first and second surfaces S1 and S2 facing each other in the first direction (X direction), third and fourth surfaces S3 and S4 facing each other in the second direction (Y direction), and fifth and sixth surfaces S5 and S6 facing each other in the third direction (Z direction). The ceramic body 110 may further include a first external electrode 131 disposed on the first surface S1 of the ceramic body 110 and connected to the first internal electrode 121, and a second external electrode 132 disposed on the second surface S2 of the ceramic body 110 and connected to the second internal electrode 122.

Here, the first external electrode 131 may include a first base electrode layer 131a disposed in contact with the ceramic body 110, a first glass layer 131b disposed on the first base electrode layer 131a, and a first resin electrode layer 131c disposed on the first glass layer 131b. Further, the second external electrode 132 may include a second base electrode layer 132a disposed in contact with the ceramic body 110, a second glass layer 132b disposed on the second base electrode layer 132a, and a second resin electrode layer 132c disposed on the second glass layer 132b.

In the multilayer ceramic electronic component 100 according to an exemplary embodiment of the present disclosure, the first glass layer 131b and the second glass layer 132b are disposed between the first base electrode layer 131a and the first resin electrode layer 131c and between the second base electrode layer 132a and the second resin electrode layer 132c, whereby bonding force between the base electrode layer and the resin electrode layer may be increased to improve the mechanical strength of the multilayer ceramic electronic component 100. In addition, since the first glass layer 131b and the second glass layer 132b may function as moisture barrier layers, moisture resistance reliability of the multilayer ceramic electronic component 100 may be improved. Details of the improvement of the bonding force will be described later.

The ceramic body 110 of the multilayer ceramic electronic component 100 according to an exemplary embodiment of the present disclosure may include the dielectric layer 111 and the first and second internal electrodes 121 and 122 disposed to be stacked in the third direction (Z direction) with the dielectric layer 111 interposed therebetween.

There is no particular limitation on a specific shape of the ceramic body 110, but as shown, the ceramic body 110 may have a hexahedral shape or a similar shape. Due to the shrinkage of the ceramic powder contained in the ceramic body 110 during a firing process, the ceramic body 110 may have a substantially hexahedral shape, although it is not a hexahedral shape having a complete straight line. If necessary, the ceramic body 110 may be rounded so that the corners are not angled. The rounding treatment may be, for example, barrel polishing, but is not limited thereto.

In the ceramic body 110, the dielectric layer 111, the first internal electrode 121, and the second internal electrode 122 may be alternately stacked. The dielectric layer 111, the first internal electrode 121, and the second internal electrode 122 may be stacked in the third direction (Z direction). The plurality of dielectric layers 111 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layer 111 is not limited as long as sufficient capacitance may be obtained. For example, a barium titanate-based material, a lead composite perovskite-based material, or a strontium titanate-based material may be used, or a component expressed as (Ba1-xCax) (Ti1-y(Zr, Sn, Hf)y)O3 (here, $0 \le x \le 1$, $0 \le y \le 0.5$) may be used. Also, as a material for forming the dielectric layer 111, various ceramic additives, organic solvents, plasticizers, binders, dispersants, etc. may be added to the powder such as barium titanate ($BaTiO_3$) or the like according to purposes of the present disclosure.

The dielectric layer 111 may be formed by adding an additive as necessary to a slurry containing the aforementioned material, applying slurry on a carrier film, and drying the slurry to prepare a plurality of ceramic sheets. The ceramic sheet may be formed by fabricating the slurry into a sheet type having a thickness of several μm by a doctor blade method, but is not limited thereto.

The first and second internal electrodes 121 and 122 may be stacked so that cross sections thereof are exposed to opposing ends of the ceramic body 110, respectively. Specifically, the first and second internal electrodes 121 and 122 may be exposed to two opposing surfaces of the ceramic body 110 in the first direction (X direction), respectively, and in this case, the first internal electrode 121 may be exposed in a direction of the first surface S1 of the ceramic body 110 and the second internal electrode 122 may be exposed in a direction of the second surface S2 of the ceramic body 110.

A material for forming the first and second internal electrodes 121 and 122 is not particularly limited. For example, the first and second internal electrodes 121 and 122 may be formed using a conductive paste including one or more conductive metals among, for example, silver (Ag), palladium (Pd), gold (Au), platinum (Pt), nickel (Ni), copper (Cu), tin (Sn), tungsten (W), titanium (Ti), and alloys thereof.

The ceramic body 110 may be formed by alternately stacking a ceramic green sheet in which the first internal electrode 121 is printed on the dielectric layer 111 and a ceramic green sheet in which the second internal electrode 122 is printed on the dielectric layer 111 in the third direction (Z direction). The printing method of the first and second internal electrodes 121 and 122 may be a screen printing method or a gravure printing method, but is not limited thereto.

In the multilayer ceramic electronic component 100 according to an exemplary embodiment of the present disclosure, the first external electrode 131 and the second external electrode 132 may be disposed on opposing surfaces of the ceramic body 110 in the first direction (X direction). The first external electrode 131 may be connected to the first internal electrode 121, and the second external electrode 132 may be connected to the second internal electrode 122. The first external electrode 131 and the second external electrode 132 may be disposed on the first surface S1 and the second surface S2 of the ceramic body 110, respectively. The first external electrode 131 may include a first base electrode layer 131a, a first glass layer 131b, and a first resin electrode layer 131c, and the second external electrode 132 may include a second base electrode layer 132a, a second glass layer 132b, and a second resin electrode layer 132c.

In one exemplary embodiment in the present disclosure, first and second base electrode layers 131a and 132a respectively connected to the first and second internal electrodes 121 and 122 of the multilayer ceramic electronic component 100 of the present disclosure may be sintered electrodes including a first conductive metal. For the first conductive metal included in the first and second base electrode layers 131a and 132a, various metals having excellent contact with the internal electrodes may be used. For example, the first conductive metal may be one or more metal components selected from the group consisting of copper (Cu), nickel (Ni), tin (Sn), palladium (Pd), platinum (Pt), iron (Fe), gold (Au), silver (Ag), tungsten (W), titanium (Ti), lead (Pb), and alloys thereof. In a case in which the first and second base electrode layers 131a and 132a are formed of sintered electrodes including the first conductive metal as in the present exemplary embodiment, the connection between the first and second base electrode layers 131a and 132a and the internal electrodes may be improved and mechanical strength of the multilayer ceramic electronic component 100 may be increased.

A method of forming the first and second base electrodes 131a and 132a is not particularly limited. For example, the first and second base electrodes 131a and 132a may be formed by applying or printing a conductive paste including the first conductive metal on a surface of the body 110 by a screen printing method or a gravure printing method, dipping the ceramic body 110 in the conductive paste, or transferring a dry film formed by drying the conductive paste onto the ceramic body 110. That is, various methods may be used without being limited.

In an exemplary embodiment in the present disclosure, the first and second glass layers 131b and 132b disposed on the first base electrode layer 131a and the second base electrode layer 132a, respectively, may include conductive glass. In the present disclosure, "conductive glass" may refer to a glass having electrical conductivity of $1 \times 10^{-13}$ S/cm or more or $1 \times 10^{-9}$ S/cm or more. Examples of the conductive glass may include, but are not limited to, ion conductive glass, electron-conductive glass, and/or mixed conductive glass.

In an exemplary embodiment in the present disclosure, the conductive glass applied to the multilayer ceramic electronic component 100 of the present disclosure may include one or more selected from the group consisting of, for example, silicon (Si), boron (B), aluminum (Al), transition metal, alkali metals, alkaline earth metals, and oxide nitrides, carbides and carbonates thereof. In addition, the transition metal may be one or more selected from the group consisting of zinc (Zn), titanium (Ti), copper (Cu), vanadium (V), manganese (Mn), iron (Fe), and nickel (Ni). In addition, the alkali metal may be one or more selected from the group consisting of lithium (Li), sodium (Na), and potassium (K), and the alkaline earth metal may be one or more selected from the group consisting of magnesium (Mg), calcium (Ca), and strontium (Sr), and barium (Ba), but is not limited thereto.

Figure 6:
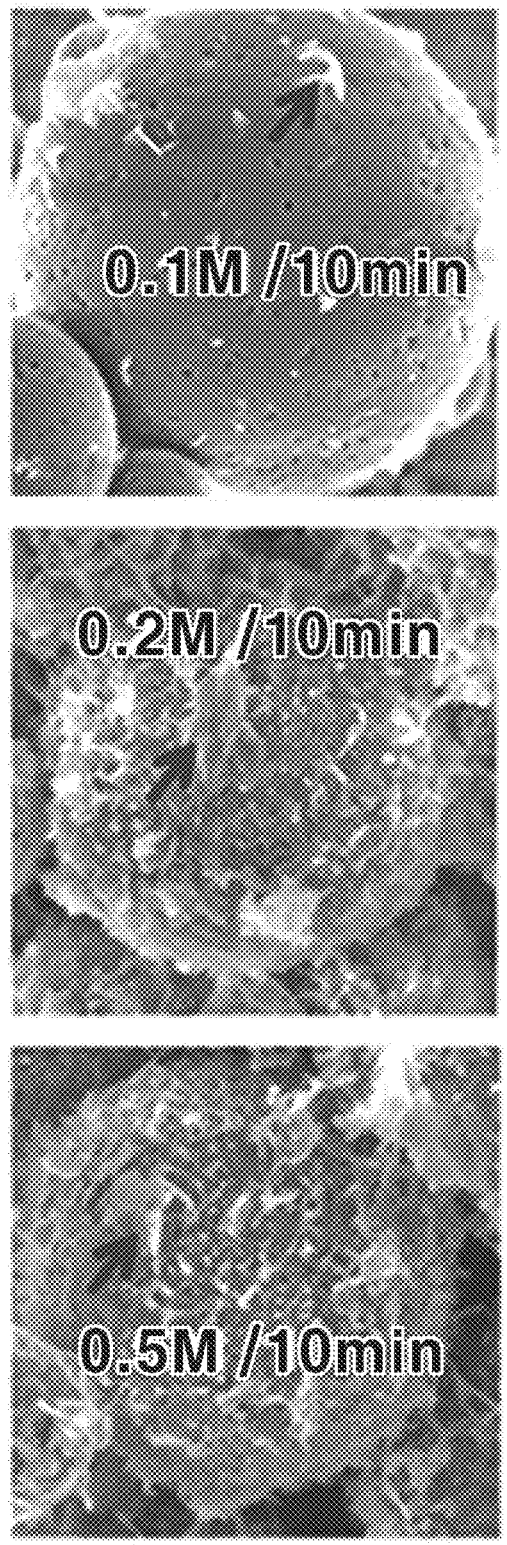
FIG. 6 is an SEM image of a surface of a conductive glass according to the present disclosure.

A method of manufacturing the conductive glass is not particularly limited. FIG. 6 is an SEM image of a surface of the conductive glass applied to the present disclosure. Referring to FIG. 6, the conductive glass of the multilayer ceramic electronic component according to an exemplary embodiment of the present disclosure may have a structure in which a metal is disposed on a surface of the glass particles. As a method of manufacturing the conductive glass, a method of coating a metal layer on a surface of glass particles by allowing a component such as Cu, Ag, etc., which has a standard reduction potential higher than that of the metal component to react to a glass containing a metal component such as Ba, Ca, Zn, Al, B, Si, Li, and W, may be used, but is not limited thereto. As coating metal salt concentration increases during coating, more coating of metal on a glass particles were obtained.

In an exemplary embodiment of the present disclosure, the first and second glass layers 131b and 132b of the multilayer ceramic electronic component 100 may be disposed by coating the surface of the glass component with a second conductive metal. A second conductive metal may be eluted from the conductive glass. The first and second glass layers 131b and 132b of the multilayer ceramic electronic component 100 may be formed by applying a paste including the aforementioned conductive glass to the first and second base electrode layers 131a and 132a, drying the paste, and then heat-treating the dried paste. Here, a solvent or the like contained in the paste may be evaporated, and the conductive glass particles may form a glass layer. During this process, some metal components such as the second conductive metal included in the conductive glass may be eluted to the outside, and the eluted metal components may form a metal coating layer on the first and second glass layers 131b and 132b. The metal coating layer may be irregularly disposed and may not necessarily be disposed to cover all surfaces of the first and second base electrode layers 131a and 132a. That is, the metal coating layer may be randomly disposed on the first and second base electrode layers 131a and 132a.

In an example of the present disclosure, the second conductive metal applied to the first and second conductive layers 131b and 132b is not particularly limited as long as it has relatively good compatibility with glass. Non-limiting examples of the second conductive metal include silver (Ag), platinum (Pt), gold (Au), tin (Sn), and/or iron (Fe), but are not limited thereto.

In another example of the present disclosure, an average surface roughness Ra of the first glass layer 131b and the second glass layer 132b may be 0.1 μm or more. In the present disclosure, the average surface roughness Ra of a surface may be a value measured using an optical surface profiler such as 7300 Optical Surface Profiler of Zygo Corporation or a value measured using a surface roughness meter SV-3200 of Mitutoyo. An upper limit of the average surface roughness Ra of the first glass layer 131b and the second glass layer 132b is not particularly limited, but may be, for example, 100 µm or less, or preferably 50 µm or less. When the average surface roughness Ra of the first glass layer 131b and the second glass layer 132b satisfies the above range, respective bonding force between the first and second base electrode layers 131a and 132a and the first and second resin electrode layers 131c and 132c may be increased. The surface roughness of the first and second glass layers 131b and 132b may be formed due to the aforementioned metal coating layer, and the surface roughness in the above range may be formed by controlling the amount of the eluted metal component by controlling a heat treatment temperature when the first and second glass layers 131b and 132b are formed.

In an exemplary embodiment, an average thickness of the first glass layer 131b and the second glass layer 132b of the multilayer ceramic electronic component 100 may be 1 µm or more and/or 20 µm or less. The average thickness of the first glass layer 131b and the second glass layer 132b may be a value obtained by measuring a thickness of a cross-section at central portions at the head surfaces of the first and second external electrodes 131 and 132—opposing surfaces thereof in the first direction (X direction) of the multilayer ceramic electronic component 100, and may refer to an arithmetic mean of values measured from certain 5 points within 1 µm based on the central portions of the opposing surfaces of the first and second external electrodes 131 and 132 in the first direction (X direction). When the average thickness of the first glass layer 131b and the second glass layer 132b of the present example satisfies the above range, external electrodes having relatively low ESR and excellent bonding strength may be formed. The measurement of an average thickness is not limited to these examples, and one of ordinary skill may select the number of measurement points, the interval between the measurement points, and so forth, if needed. The measurement of the thickness for each measurement point may be done by using a microscopy image, for example, a scanning electron microscope (SEM) image, but is not limited thereto.

In an exemplary embodiment in the present disclosure, the first and second glass layers 131b and 132b of the multilayer ceramic electronic component 100 of the present disclosure may be disposed to cover the first and second base electrode layers 131a and 132a, respectively. In this disclosure, disposing a layer to "cover" another layer may refer to a structure in which a layer located on an inner side is not exposed to the outside and may refer to a structure in which a layer is disposed on the inner side of a layer disposed on an outer side and here only the layer disposed on the outer side is visible from the outside. As described above, when the first and second glass layers 131b and 132b are disposed to cover the first and second base electrode layers 131a and 132a, respectively, the first and second glass layers 131b and 132b may function as moisture barrier layers to prevent penetration of moisture, etc.

In an exemplary embodiment in the present disclosure, the first and second resin electrode layers 131c and 132c of the multilayer ceramic electronic component 100 may include a conductivity imparting agent and a base resin. That is, the first and second resin electrode layers 131c and 132c of the present exemplary embodiment may be resin-based electrodes. The resin-based electrode has a structure in which a conductivity imparting agent is dispersed in the base resin. Since the resin-based electrode is manufactured in an environment at a lower temperature than the sintered electrode, the conductivity imparting agent may exist in the form of particles inside the base resin. In addition, when the first and second resin electrode layers 131c and 132c are disposed outside the first and second glass layers 131b and 132b, respectively, physical stress such as external impacts may be blocked.

The conductivity imparting agent may include a third conductive metal and/or a conductive polymer. The conductive metal may be, for example, one or more selected from the group consisting of calcium (Ca), titanium (Ti), molybdenum (Mo), tungsten (W), iron (Fe), cobalt (Co), nickel (Ni), palladium (Pd), platinum (Pt), copper (Cu), silver (Ag), gold (Au), zinc (Zn), aluminum (Al), tin (Sn), lead (Pb), and alloys thereof, but is not limited thereto.

In addition, as a non-limiting example of the third conductive polymer, the third conductive polymer may include sulfur (S) and/or nitrogen (N)-containing compounds such as PT(poly(thiophene)), PEDOT(poly(ethylenedioxy)thiophene), PPS(poly(p-phenylene sulfide)), PANI(polyanilines), P3HT(poly(3-hexylthiophene-2,5-diyl)), PolyTPD (poly(4-butylphenyldiphenylamine)), PSS(poly(4-butylphenyldiphenylamine)), PVK(poly(9-vinylcarbazole)), PDBT(poly(4,4'-dimethoxy bithophene)), polyaniline, or polypyrrole, and compounds not including a hetero atom such as poly(fluorine), polyphenylene, polypyrene, polyazulene, polynaphthalene, PAC(poly(acetylene)), PPV(poly (p-phenylene vinylene), but is not limited thereto.

The first and second resin electrode layers 131c and 132c may include a conductive filler including a carbon filler such as carbon nanotubes, graphene, fullerene, or the like and/or an spherical, elliptical, flake, fibrous, or dendrite type alloy filler as necessary, but is not limited thereto.

The base resin included in the first and second resin electrode layers 131c and 132c may be, for example, a thermosetting resin. Specific examples of the thermosetting resin include s phenol resin, a urea resin, a diallylphthalate resin, a melanin resin, a guanamine resin, a unsaturated polyester resin, a polyurethane resin, an epoxy resin, an aminoalkyd resin, a melamine-urea cocondensation resin, a silicon resin, a polysiloxane resin, and the like, but are not limited thereto. In the case of using the thermosetting resin, a crosslinking agent, a curing agent such as a polymerization initiator, a polymerization accelerator, a solvent, a viscosity modifier, and the like may be further added and used as necessary.

In an example, the first and second resin electrode layers 131c and 132c of the multilayer ceramic electronic component 100 of the present disclosure may be disposed to cover the first and second glass layers 131b and 132b, respectively. When the first and second resin electrode layers 131c and 132c are disposed to cover the first and second glass layers 131b and 132b, respectively, the first and second resin electrode layers 131c and 132c may function to block external contaminants and block external impacts from being transmitted to the inside.

A method of forming the first and second resin electrode layers 131c and 132c is not particularly limited. For example, the first and second resin electrode layers 131b and 132b may be formed by dipping a ceramic body in a conductive paste containing a base resin and a conductivity imparting agent, printing the conductive paste on a surface of the ceramic body by screen printing or gravure printing, or by applying the conductive paste to the surface of the ceramic body or transferring a dry film formed by drying the conductive paste onto the ceramic body, and the like. That is, various methods may be used without being limited.

In an exemplary embodiment in the present disclosure, the multilayer ceramic electronic component 100 may include a first plating layer (not shown) disposed on the first resin electrode layer 131c and a second plating layer (not shown) disposed on the second resin electrode layer 132c. The first and second plating layers may be formed by sputtering or electric deposition, but is not limited thereto. A material for forming the first and second plating layers is not particularly limited, and may include nickel (Ni), copper (Cu), tin (Sn), palladium (Pd), platinum (Pt), gold (Au), silver (Ag), tungsten (W), titanium (Ti), or lead (Pb) alone or alloys thereof.

<Experimental Example>

A test was carried out on moisture resistance reliability and ESR using a mass-produced chip (temperature characteristic X7R and capacity 220.0 nF) of 1005 size (length× width: 1.0 mm×0.5 mm) with external electrodes disposed on surfaces of the ceramic body in the length direction.

A conductive glass was prepared by allowing a glass containing BaO, CaO, ZnO, $Al_2O_3$, $B_2O_3$, and $SiO_2$ to react to an aqueous solution of silver nitrate ($AgNO_3$) having a molar concentration of 0.02M. Thereafter, first and second glass layers were disposed on a ceramic body on which a sintered electrode including copper (Cu) was formed as first and second base electrode layers, and a resin electrode layer including epoxy and copper was formed to manufacture a prototype chip.

Moisture resistance reliability was determined whether or not defects occurred after applying a voltage of 37.5 V to 100 chips for 12 hours under condition (8585) of 85 □ and relative humidity of 85%. A defective chip was marked as NG and a chip without a defect was marked as OK.

Figure 7:
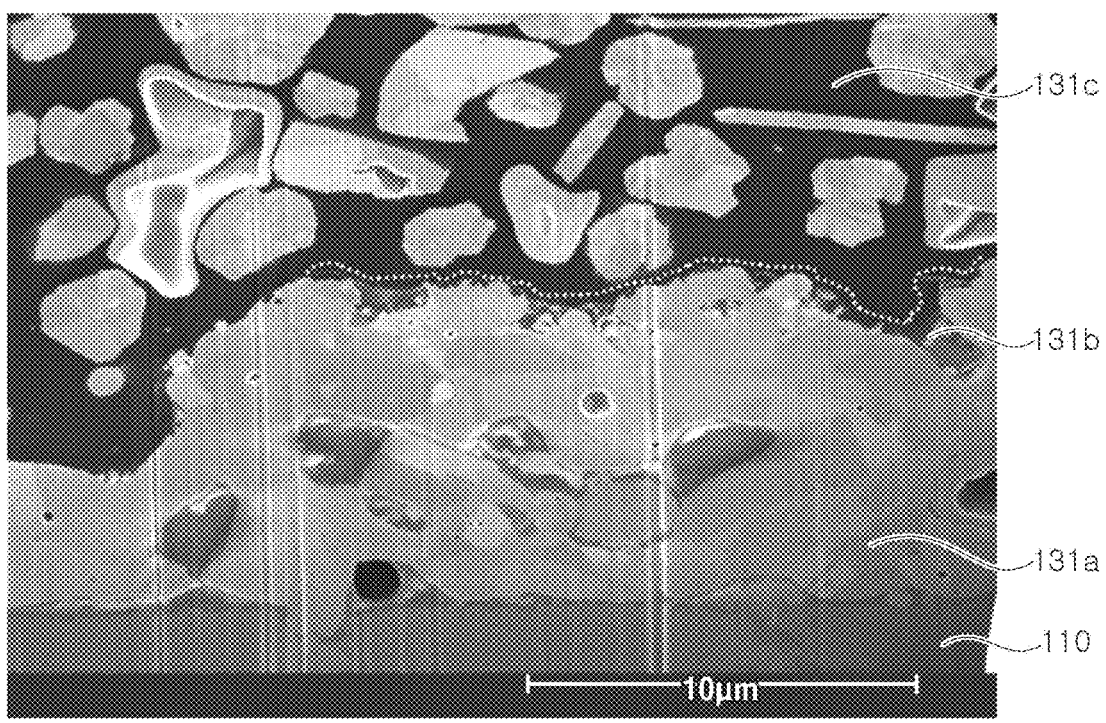
FIG. 7 is an SEM image of a cross section of an external electrode according to an exemplary embodiment in the present disclosure.

FIG. 7 is a SEM image of a cross-section of the manufactured prototype chip. Referring to FIG. 7, it can be seen that abase electrode layer is disposed on the ceramic body, a glass layer is disposed on the base electrode layer, and a resin electrode layer is disposed on the glass layer in the structure.

Table 1 below shows test results for the prototype chip in which the thickness of the glass layer was adjusted under the same conditions.

TABLE 1

| Average thickness of glass layer (μm) | Moisture resistance reliability test (8585) | ESR (mΩ) |
| --- | --- | --- |
| 1 | OK | 8 mΩ |
| 2 | OK | 7 mΩ |
| 3 | OK | 7 mΩ |
| 5 | OK | 5 mΩ |
| 10 | OK | 7 mΩ |
| 15 | OK | 7 mΩ |
| 20 | OK | 10 mΩ |
| 30 | OK | 30 mΩ |
| 40 | OK | 40 mΩ |
| 50 | OK | 50 mΩ |

Referring to Table 1, it can be seen that, when the thickness of the glass layer is 20 μm or less, the ESR is low and excellent moisture resistance reliability is obtained, but when the thickness of the glass layer exceeds 20 μm, defects may occur as internal stress of the chips is not smoothly resolved and ESR may increase due to the thick glass layer.

In addition, if the thickness of the glass layer is less than 1 μm, sufficient roughness cannot be formed so an interfacial bonding strength cannot be imparted.

As set forth above, according to exemplary embodiments of the present disclosure, moisture resistance reliability of the multilayer ceramic electronic component may be improved.

According to exemplary embodiments of the present disclosure, the mechanical strength of the multilayer ceramic electronic component may be improved by improving bonding force between the external electrodes, while the external electrodes are formed to be thin.

According to exemplary embodiments of the present disclosure, the multilayer ceramic electronic component that implements low ESR, while preventing a peel-off phenomenon or delamination between the external electrodes may be provided.

While exemplary embodiments have been shown and described above, it will be apparent to those skilled in the art that modifications and variations could be made without departing from the scope of the present disclosure as defined by the appended claims.

What is claimed is:

1. A multilayer ceramic electronic component comprising:
a ceramic body including a dielectric layer and first and second internal electrodes disposed to be alternately stacked with the dielectric layer interposed therebetween;
a first external electrode disposed on a first surface of the ceramic body and connected to the first internal electrode of the ceramic body; and
a second external electrode disposed on a second surface of the ceramic body and connected to the second internal electrode, the second surface being opposite the first surface in a first direction,
wherein the first external electrode includes a first base electrode layer contacting the first internal electrode, having a metal, disposed in contact with the ceramic body, and a first glass layer disposed on the first base electrode layer, and
the second external electrode includes a second base electrode layer contacting the second internal electrode, having a metal, disposed in contact with the ceramic body, and a second glass layer disposed on the second base electrode layer,
wherein each of the first and second base electrode layers have a metal coating layer randomly disposed thereon and within the corresponding first and second glass layers.

2. The multilayer ceramic electronic component of claim 1,
wherein the first external electrode further includes a first resin electrode layer disposed on the first glass layer, and
the second external electrode further includes a second resin electrode layer disposed on the second glass layer,
wherein each of the first and second glass layers includes a conductive glass including a glass component and a conductive metal coated on a surface of the glass component,
wherein the first and second resin electrode layers include a conductive filler comprising carbon,
wherein the conductive glass has an electrical conductivity of $1 \times 10^{-13}$ S/cm or more.

3. The multilayer ceramic electronic component of claim 2, wherein each of the first and second base electrodes includes one or more metal components selected from a group consisting of copper (Cu), nickel (Ni), tin (Sn), palladium (Pd), platinum (Pt), iron (Fe), gold (Au), silver (Ag), tungsten (W), titanium (Ti), lead (Pb), and alloys thereof.

4. The multilayer ceramic electronic component of claim 2, wherein the first and second glass layers include one or more selected from a group consisting of silicon (Si), boron (B), aluminum (Al), transition metal, alkali metals, alkaline earth metals, and oxide nitrides, carbides and carbonates thereof.

5. The multilayer ceramic electronic component of claim 2, wherein an average surface roughness Ra of each of the first and second glass layers is 1.0 μm or more.

6. The multilayer ceramic electronic component of claim 2, wherein the first and second glass layers are disposed to cover the first and second base electrode layers, respectively.

7. The multilayer ceramic electronic component of claim 2, wherein each of the first and second resin electrode layers includes a conductivity imparting agent and a base resin.

8. The multilayer ceramic electronic component of claim 2, wherein the first and second resin electrode layers are disposed to cover the first and second glass layers, respectively.

9. The multilayer ceramic electronic component of claim 2, further comprising first and second plating layers disposed on the first and second resin electrode layers, respectively.

10. The multilayer ceramic electronic component of claim 1, wherein the first and second base electrode layers are sintered electrodes.

11. The multilayer ceramic electronic component of claim 1, wherein each of the first and second glass layers includes conductive glass.

12. The multilayer ceramic electronic component of claim 1, wherein a thickness of each of the first and second glass layers is 1 μm or more and 20 μm or less.

13. The multilayer ceramic electronic component of claim 1,
wherein the first and second external electrodes further include first and second resin electrode layers disposed on the first and second glass layers, respectively, and
the metal coating layer comprises a first metal coating layer disposed between the first glass layer and the first resin electrode layer and a second metal coating layer disposed between the second glass layer and the second resin electrode layer.

* * * * *